3,422,185
NAIL ENAMEL COMPOSITION CONTAINING QUATERNARY AMMONIUM CATION MODIFIED MONTMORILLONITE CLAYS
Alexander M. Kuritzkes, 35 Observatory Drive, Croton-on-Hudson, N.Y. 10520
No Drawing. Continuation-in-part of applications Ser. No. 355,952, Mar. 30, 1964, and Ser. No. 666,993, Sept. 11, 1967. This application June 10, 1968, Ser. No. 735,527
U.S. Cl. 424—61       11 Claims
Int. Cl. A61k 7/04

ABSTRACT OF THE DISCLOSURE

Nail enamel composition having suspended therein a nacreous pigment and from 0.4 to 6.0% by weight of a quaternary ammonium cation-modified montmorillonite clap suspending agent.

CROSS REFERENCE TO OTHER APPLICATIONS

This application is a continuation-in-part of application Ser. No. 355,952 filed on Mar. 30, 1964, and now abandoned; and application Ser. No. 666,993 filed on Sept. 11, 1967, now abandoned.

BACKGROUND OF THE INVENTION

Field of the invention.—This invention relates to a novel nail enamel composition, and particularly to such a composition which contains natural pearl essence or other nacreous pigments.

Nail enamels are film-forming lacquers which generally are air-dried at ambient temperatures. As described, for example, in "Nail Lacquers and Removers," Peirano, chapter 30, Cosmetics Science and Technology, Interscience Publishers, Inc., 1957, such lacquers are constituted of several known ingredients, viz, (1) a film-former; (2) a resin; (3) a plasticizer; (4) a solvent; and (5) a suitable colorant. In various formulations, particularly those containing nacreous pigments such as described hereinafter, the colorant constituent may suitably be replaced in whole or in part by the nacre-producing pigment. "Nacreous Bases in Cosmetics," Sabetay et al., Soap, Perfumery and Cosmetics, January 1961, pp. 57–60; "Compounder's Corner-Pearl Essence," Drug and Cosmetic Industry, 88 (No. 3), March 1961, pp. 369–370; and "Hand Preparations," Alexander, Manufacturing Chemist and Aerosol News, June 1966, pp. 37–44.

Conventional nail lacquers generally include nitrocellulose (more properly cellulose nitrate) as the film-forming constituent thereof. Other conventional film-formers, e.g., cellulose acetate-butyrate, may, however, similarly be so utilized. The resin ingredient of a nail enamel is so chosen as to modify the characteristics of the film-former employed to impart sufficient hardness, resistance to chipping, and adhesive characteristics to the dried film. Resins known to be so useful include synthetic resins such as arylsulfonamide-formaldehyde resins, and various polyester and alkyd resins; and naturally occurring resins such as dammar. In some instances, the same material may impart both the film-forming and resin-hardening characteristics to the nail enamel; for example, polystyrene may be so useful.

The plasticizer constituent or constituents of a nail enamel formulation are chosen in accordance with a wide variety of factors, depending not only upon the composition of the film-former but upon the effect of the individual plasticizer on viscosity of the enamel, drying rates, etc. useful plasticizers include tricresyl phosphate, dibutyl phthalate, triethyl citrate, ortho- and para-toluene sulfonamides, and camphor.

The solvent system employed as the volatile portion of the lacquer generally includes (a) one or more active solvents, (b) couplers or latent solvents, and (c) diluents. Typical active solvents for nitrocellulose, for example, include ethyl acetate, n-butyl acetate, n-amyl acetate or the like. Alchohols such as ethanol may be employed as latent solvents. Finally, hydrocarbons such as toluene may be employed as diluents in such lacquers.

The colorants incorporated in nail enamels impart the desired cosmetically acceptable shades and serve to opacify the dried films. A wide variety of dyes and pigments may be thus utilized. The pigment may, for example, be a white pigment, e.g., $TiO_2$.

Typical nail enamel formulations may have solids contents varying from about 20 to 35% and, more usually, from about 24 to 30%. Such formulations generally contain from about 8 to 16% film-former, from about 2 to 10% modifying resin, from about 2 to 10% plasticizer, and from about .001 to 5% colorant, the balance of the composition constituting the solvent system employed. The percentages given above, as well as all parts and percentages specified below are (unless otherwise indicated) by weight.

The particular proportions of the ingredients in any specific nail enamel are within the purview of those having ordinary skill in the art, and depend upon the identity of the individual ingredients, the desired drying and hardening rates, and the characteristics of the final film, in addition to economic considerations which may underscore commercial choice.

It is further known to incorporate in nail enamel lacquers natural pearl essence or other nacreous pigments, in order to impart the characteristic luster of such pigments to the desired films. The nacreous pigments constitute a known class of materials which, because of light reflection effects, exhibit pearly luster upon reflection of light therefrom; such materials are described, for example, in "Nacreous Pigments and Their Properties," Greenstein, Proceedings of the Scientific Section of the Toilet Goods Association, No. 45, pp. 20–26, May 1966; and in "Properties of Nacreous Pigments," Greenstein and Miller, Technical Papers, Volume XIII, Annual Technical Conference, Society of Plastic Engineers, Inc., Detroit, Mich., 1967.

"Natural pearl essence" consists of a suspension of the brilliant, reflective, transparent, plate-like guanine crystals obtained from the scale and skin of fish, such as the herring. Synthetic nacreous pigments are synthetic substances which have optical properties similar to those of natural pearl essence because they also consist of insoluble transparent platelets of high index of refraction. Examples are bismuth oxychloride and titanium dioxide-coated mica.

The nacreous pigments are discrete particles having the form of platelets, lengths of from about 2 to 100 microns and ratios of length to thickness of at least 4. Natural pearl essence, for example, comprises platelets which range in length from about 10 to 60 microns, and in thickness from about 20 to 80 millimicrons.

In order to provide the particular pearly reflection or "nacre" exhibited by nacreous pigments, the index of refraction of the particles comprising such pigments must be at least 0.2 unit different from that of the film or plastic in which the pigment is incorporated. Commercially available nacreous pigments have indices of refraction greater than the carriers in which they are incorporated. Since the plastic vehicles commonly used for nacreous pigments have refractive indices from 1.5 to 1.6, the refractive index required for nacreous pigment platelets is generally at least about 1.8.

The primary purpose in the use of nacreous pigments in nail enamel is decorative; the nail acquires a pearly luster. The appearance is quite attractive and some nail enamels contain nacreous pigment without any colorant. When nacreous pigments are so utilized they may be employed, either alone or together with other nail enamel colorants in amounts of the same order as those employed for colorant ingredients of conventional nail enamels.

A second advantage accruing from the presence of nacreous pigment in nail enamels is an increase in film strength and adhesion to the nail. The nacreous pigment particles tend to reinforce the film.

The prior art.—One disadvantage resulting from the the use of nacreous pigments in nail enamels is that the pigment particles are sufficiently large that they tend to settle and to pack on the bottom of the nail enamel container. Apart from the fact that enamels subject to such settling are not desirable for display purposes, the eventual user is further compelled to re-disperse the platelets prior to application. Heretofore, attempts to avoid such settling and packing have been unsuccessful, because the additives which were tried tended to decrease the pearl-like luster of the polish. Thus, for example, thickening agents such as silica have been tested in connection with pearlescent nail enamels. Although these have satisfactorily prevented the settling of the nacreous pigment platelets, any improvement in settling characteristics has invariably been at the expense of one of the other characteristics of the nail enamel. The pearl luster in particular is frequently damaged by such agents. See the Drug and Cosmetic Industry reference cited supra, at page 370.

A large variety of materials have heretofore been described as suspending agents for the constituents of various coating compositions. Some previously known suspending agents are described, for example, in United States Patents Nos. 2,417,344, 2,622,987, and 2,997,403. Neither these patents nor other disclosures in the prior art have been addressed to or have succeeded in providing a non-settling nail enamel composition incorporating nacreous pigment particles.

Accordingly, one of the objects of this invention is to provide a nail enamel composition in which nacreous pigment platelets are held in suspension without any deleterious effect on the luster or other qualities of the pigment.

These and other objects of this invention will become apparent from the following detailed description thereof.

SUMMARY OF THE INVENTION

A coating which shows the luster of nacreous pigments to advantage must have the following characteristics:

(1) it must have good gloss, (2) it must be sufficiently transparent to permit the nacreous pigment to reflect in depth, and (3) it must hold the platelets in a satisfactory orientation, that is, the platelets must all lie with their broad faces more or less parallel to the fingernail so that the reflections from the multitude of platelets are concentrated in a particular direction, thus producing the pearly or nacreous appearance.

Surprisingly, it has been found that non-settling, lustrous nacreous pigment-containing nail enamels may be provided, which enamels form coatings possessing the preceding characteristics and which enamels incorporate a heretofore known specific type of suspending or anti-settling agent. In particular, it has been discovered that such non-settling nacreous pigment-containing nail enamels may be provided by incorporating organophilic tetra-substituted ammonium cation-modified montmorillonite clays in the composition, such clays imparting thixotropic behavior to the enamel without interfering with the brushability or nacreous luster thereof. Indeed, in addition to imparting non-settling characteristics to the nail namel, the pearl luster of the enamel is preserved or improved, rather than being impaired, by use of the non-settling agent of the present invention.

The organophilic tetra-substituted ammonium cation-modified clays of the present invention may be incorporated, together with nacreous pigments, in any conventional nail enamel lacquer formulations of the types referred to hereinabove and described more fully, for example, in the aforesaid chapter from Cosmetics Science and Technology, 1957. It is to be noted that the particular conventional ingredients, or the proportions of ingredients, in such nail enamels form no part of the present invention.

PREFERRED EMBODIMENTS OF THE INVENTION

The organophilic tetra-substituted ammonium cation-modified clay suspending agents employed in the practice of the present invention include those described, for example, in Hauser United States Patent No. 2,431,427. The term "organophilic" as used above refers to the fact that the modified clay suspending agent material exhibits, in organic liquids, some of those characteristics which untreated clay exhibits in water. For example, it will swell in many organic liquids and will form stable gels and colloidal dispersions. The term "tetra-substituted" as used above refers to a substituted ammonium ion in which one or more hydrogen atoms are replaced by an organic group.

In particular, the preferred suspending agents incorporated in the nail enamels hereof comprise one or more of the following quaternary ammonium cation-modified montmorillonite clays:

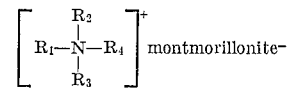

wherein $R_1$ is an alkyl group having at least 10 carbon atoms and up to, for example, 24 carbon atoms, and preferably having chain lengths of from 12 to 18 carbon atoms; $R_2$ is hydrogen, benzyl or an alkyl group of at least 10 carbon atoms and up to, for example, 24 carbon atoms, and preferably from 12 to 18 carbon atoms; and $R_3$ and $R_4$ are each hydrogen or lower alkyl groups, viz., they contain carbon chains of from 1 to 4 atoms, and preferably are methyl groups. The montmorillonite clays which may be so modified are the principal constituents of bentonite rock and have the chemical compositions and characteristics described, for example, in Berry and Mason, "Mineralogy," 1959, pp. 508–509. Modified montmorillonite clays of the type in question are commercially available from the National Lead Company, under the trade designation "Bentone–27," "Bentone–34," and Bentone–38."

The fact that the modified montmorillonite clays act as suspending or anti-settling agents for nail enamel lacquers without, however, decreasing the luster thereof is particularly surprising in the light of the published literature respecting such materials. In a paper entitled "Organophilic Bentonites III Inherent Properties," Jordan and Williams, Kolloid-Zeitschrift, 137 (1954), on page 40 et seq. (note particularly page 42), it is rather suggested that the quaternary ammonium cation-modified montmorillonite clays act as flatting agents for lacquer systems, generally reducing gloss and specular reflection without markedly altering the transparency of such films. Contrary to this teaching, I have found that such clays maintain, if not improve, the luster of nacreous pigment-containing nail enamels incorporating the same.

The quaternary ammonium cation-modified montmorillonite clay suspending agents are desirably added to nail enamel lacquers in amounts sufficient to provide concentrations varying from about 0.4 to 6% by weight of the lacquer. Such materials impart definite thixotropic behavior to nail enamel lacquers, even when added in amounts corresponding to the lower portion of the designated range. Thus, although the resulting lacquer does not actually gel, its viscosity is dependent upon the amount of shear, being high when the sample is at rest and low when the sample is agitated. It has been found, in accordance with this invention, that such lacquers retain their brilliance in the bottle, even without complete gelation.

In the upper portion of the concentration range, true thixotropic gels are produced. The pearlescent platelets not only remain permanently suspended, but the suspension retains its brilliant pearl luster indefinitely because the orientation, which is produced by pouring the nail enamel into the bottle or by stirring, is fixed.

Thus, the nail enamels of the present invention have a brilliance in the container which indicates to the consumer the type of coating which will be obtained. Ordinary pearlescent nail enamels, in which the nacreous platelets have collected at the bottom of the bottle, do not have an appearance commensurate with their end use.

The ammonium cation-modified montmorillonites not only fail to diminish pearl luster, but in many cases actually increase the luster of the coating on the fingernail. Apparently, the lacquers containing the additive offer a slight degree of resistance to the brush, with the result that the nacreous pigment platelets are better oriented than in the absence of the modified clay additives.

The advantages of these additives are further illustrated by the following examples:

Examples 1–8.—Nail enamels containing different ammonium montmorillonite clays

Nail enamel lacquers were compounded with different ammonium cation-modified montmorillonite clay additives. Each composition was based upon a standard lacquer formation typical of commercially available nail enamels and incorporating the following ingredients:

(1) Film-former—Nitrocellulose;
(2) Resin—Arylsulfonamide-formaldehyde resin (commercially available as "Santolite MHP" from the Monsanto Chemical Co.);
(3) Plasticizer—Camphor and dibutyl phthalate;
(4) Solvent system:
  (a) Solvent—n-butyl acetate, n-amyl acetate and ethyl acetate;
  (b) Coupler or co-solvent—isopropanol and ethanol;
  (c) Diluent—toluene.

The standard lacquer formulations were compounded with the different clay additives in the varying proportions indicated in Tables I and II below, and the lacquers were admixed with natural pearl essence, $TiO_2$-coated mica, or BiOCl nacreous pigments as described more fully hereinafter.

TABLE I.—COMPOSITION OF NAIL ENAMELS OF EXAMPLES 1 TO 4

[Parts by weight]

| Example | 1 | 2 | 3 | 4 |
|---|---|---|---|---|
| Nitrocellulose solution: | | | | |
| Nitrocellulose, "½ second" ("RS Type"—Hercules) | 10.0 | 10.0 | 10.0 | 10.0 |
| Isopropanol | 5.0 | 5.0 | 5.0 | 5.0 |
| N-butyl acetate | 12.8 | 12.8 | 12.8 | 12.8 |
| N-amyl acetate | 11.1 | 11.1 | 6.1 | 6.1 |
| Ethyl acetate | 11.1 | 11.1 | 6.1 | 6.1 |
| Camphor | 2.5 | 2.5 | 2.5 | 2.5 |
| Dibutyl phthalate | 2.5 | 2.5 | 2.5 | 2.5 |
| Arylsulfonamide-formaldehyde resin | 10.0 | 10.0 | 10.0 | 10.0 |
| Toluene | 30.5 | 32.0 | 43.5 | 39.0 |
| Ethanol | 1.5 | 1.0 | 0.5 | 2.0 |
| Dodecyl ammonium montmorillonite | 3.0 | | | |
| Octadecyl ammonium montmorillonite | | 2.0 | 1.0 | 4.0 |
| | 100.00 | 100.00 | 100.00 | 100.00 |

TABLE II.—COMPOSITION OF NAIL ENAMELS OF EXAMPLES 5 TO 8

[Parts by weight]

| Example | 5 | 6 | 7 | 8 |
|---|---|---|---|---|
| Nitrocellulose solution: | | | | |
| Nitrocellulose, "½ second" ("RS Type"—Hercules) | 10.0 | 10.0 | 10.0 | 10.0 |
| Isopropanol | 5.0 | 5.0 | 5.0 | 5.0 |
| N-butyl acetate | 12.8 | 12.8 | 12.8 | 12.8 |
| N-amyl acetate | 11.1 | 11.1 | 11.1 | 11.1 |
| Ethyl acetate | 11.1 | 11.1 | 11.1 | 11.1 |
| Camphor | 2.5 | 2.5 | 2.5 | 2.5 |
| Dibutyl phthalate | 2.5 | 2.5 | 2.5 | 2.5 |
| Arylsulfonamide-formaldehyde resin | 10.0 | 10.0 | 10.0 | 10.0 |
| Toluene | 30.5 | 32.0 | 31.25 | 30.5 |
| Ethanol | 1.5 | 1.0 | 3.0 | 1.5 |
| Dimethyl dioctadecyl ammonium montmorillonite [1] | 3.0 | | | |
| Benzyl dodecyl dimethyl ammonium montmorillonite [2] | | | 0.75 | 3.0 |
| Didodecyl ammonium montmorillonite | | 2.0 | | |
| | 100.00 | 100.00 | 100.00 | 100.00 |

[1] A commercially available material, primarily constituted of such substance, was employed; the material used was "Bentone 34," commercially available from the National Lead Company. Such material is similar in composition to "Bentone 38," which is characterized in a paper appearing in vol. 82, pages 49 et seq. of "American Perfumer and Cosmetics" (October 1967) as a dimethyl, dialkyl ammonium hectorite in which the alkyl groups are a mixture of C–18 and C–16 in a ratio of approximately 70 to 30, respectively.
[2] A commercially available material, primarily constituted of such substance, was employed; the material used was "Bentone 27," available from the National Lead Company.

Example 1.—Dodecyl ammonium montmorillonite and natural pearl essence plates

A nail enamel containing 3% dodecyl ammonium montmorillonite was prepared with the formulation shown in Table I.

The dodecyl ammonium montmorillonite was dispersed in the toluene with a high shear mixer. The ethyl and amyl acetates were added slowly with stirring, followed by the arylsulfonamide-formaldehyde resin, and the camphor and dibutyl phthalate plasticizer. The ethyl alcohol, which assists in the swelling of the montmorillonite, was added when the solids had dissolved and then the nitrocellulose solution was added.

90 parts of this lacquer were added to 10 parts of natural pearl essence, containing 11% by weight of guanine crystals obtained from fish scales.

A control sample was made from the identical ingredients, except that the 3.0% dodecyl ammonium montmorillonite in the lacquer formulation was replaced with 3.0% toluene. The montmorillonite sample and the control sample were compared for settling and for appearance on the fingernail.

After one month, the dodecyl ammonium montmorillonite-containing sample showed no settling, and appeared a brilliant silver in the bottle. The gel was easily liquefied with two or three shakes. The pearl essence crystals in the control sample, on the other hand, had settled into a hard cake, which was dispersed with great difficulty. When the two products were compared on fingernails, the dodecyl ammonium montmorillonite formulation was seen to have even more pearl luster than the control sample.

Example 2.—Octadecyl ammonium montmorillonite and natural pearl essence

In this example the type of pearl essence which is obtained from fish skins was utilized. This pearl essence contains a mixture of the same relatively large guanine crystals as are obtained from fish scales with extremely slender platelets which give the appearance of needles.

A lacquer containing 2% octadecyl ammonium montmorillonite was made in accordance with the formulation noted in Table I, following the procedure of Example 1. 90 parts of this lacquer were added to 10 parts of natural pearl essence containing 11% of the guanine crystals obtained from fish skins. A control was made from the same ingredients, except for the omission of the octadecyl ammonium montmorillonite.

After the samples had been permitted to settle for one month, the montmorillonite-containing sample appeared uniform throughout. There was no settled material at the bottom of the jar. The control sample, without the octadecyl ammonium montmorillonite, showed a hard-packed silvery layer of pearl essence on the bottom of the jar, and a fairly thick clear supernatant layer.

Example 3.—Octadecyl ammonium montmorillonite and TiO$_2$-coated mica flakes

The nail lacquer of this formulation (see Table I) was prepared with octadecyl ammonium montmorillonite, using the sequence of additions described in Example 1. 98 parts of the resulting lacquer were added to 2 parts of gold-reflecting TiO$_2$-coated mica flakes of 325-mesh size. The gold reflection from this product is produced by light interference effects, and is determined by the thickness of the TiO$_2$ coating on both faces of the mica flake. Reflections which are white or which have any desired color can be achieved by the use of a TiO$_2$ coating of appropriate thickness.

A control sample was prepared which differed from the experiment only in that the octadecyl ammonium montmorillonite was omitted.

After one month, some of the coated mica flakes in the octadecyl ammonium montmorillonite lacquer had settled, but were immediately dispersed on inverting the bottle. The flakes in the control sample had settled into a hard pack, and could be re-dispersed only with a great deal of stirring.

The nail lacquer of this formulation, when modified to include 2% and 3% octadecyl ammonium montmorillonite, showed little or no settling.

Example 4.—Octadecyl ammonium montmorillonite and bismuth oxychloride 90 parts of the lacquer of this example (see Table I) were added to 10 parts of a 35% dispersion, in nitrocellulose lacquer, of nacreous bismuth oxychloride consisting of platelets which averaged 15 microns in diameter. A control was prepared, omitting the octadecyl ammonium montmorillonite.

After one month, the bismuth oxychloride crystals in the octadecyl ammonium montmorillonite lacquer were completely suspended. The gel was liquefied with two or three shakes, and a bright pearl luster was achieved on application to finger nails.

The crystals of bismuth oxychloride were completely settled to the bottom of the control bottle, and could be dispersed only after a great deal of stirring. Brushing on the nail gave a pearl luster no greater than that of the montmorillonite experiment.

Examples 5–8.—Nail enamels containing natural pearl essence and different modified montmorillonite clay suspending agents Further lacquer formulations were prepared, incorporating the ingredients set forth in Table II, and employing the compounding technique described in Example 1. In each of Examples 5–7, 90 parts of the nitrocellulose lacquer were added to 10 parts of natural pearl essence, containing 11% by weight of guanine crystals obtained from fish scales. In Example 8, 100 parts of the suspending agent-containing lacquer were added to 10.8 parts natural pearl essence of the same type, and 0.003 part of a soluble red dye (Rhodamine B [D & C Red No. 19]) was additionally incorporated in the lacquer to impart thereto a pink shade typical of nail enamels. The Rhodamine B, a dyestuff approvide by the Food and Drug Administration for use in cosmetic formulations, was added as a 1% solution in ethanol (the alcohol being included in the amount specified in Table I).

The resulting enamels were found to retain their original reflective characteristics, without settling, over prolonged periods of storage.

Control formulations similar to the nail enamel of Example 8, but omitting the anti-settling additive thereof, or substituting other known suspending agents therefor, were prepared in like manner. The first such control lacquer (Control 8A) contained no anti-settling additive, 3.0 parts of n-butyl acetate solvent being substituted for the 3.0 parts of modified clay additive so utilized in the formulation of Example 8. Further control compositions (Controls 8B and 8C) contained like amounts of vegetable lecithin (a mixture of phosphatides) or magnesium stearate, species of materials suggested as suspending or anti-settling agents for various materials in Seright U.S. Patent No. 2,997,403, at column 2, lines 24–28 thereof. Finally, additional control compositions (Controls 8D and 8E) were prepared, incorporating benzyl trimethylammonium hydroxide (1.25 parts of 40% benzyl trimethylammonium hydroxide in methanol and 1.75 parts n-butyl acetate) or dibutylamine pyrophosphate (0.30 part dibutylamine and 0.20 part pyrophosphoric acid in 2.5 parts n-butyl acetate), species of materials suggested as suspending agents for various materials in Barrett U.S. Patent No. 2,417,344, at column 3, lines 30–36 and column 5, lines 52–53 thereof, respectively.

Following preparations of the nail lacquers of Example 8 and Controls 8A to 8E, inclusive, samples of such formulations were placed in 1 oz. cylindrical, clear glass jars and were permitted to remain undisturbed for 15 days. The samples were then qualitatively compared to determine the effect of each additive on:

The amount of settling which occurred;
The luster of the composition; and
The color retention of each composition.

The noted characteristics of the several samples tested are summarized in Table III below:

TABLE III.—COMPARISON OF CHARACTERISTICS OF NAIL ENAMELS OF EXAMPLE 8 AND CONTROLS 8A–8E

| Test Sample | Anti-Settling Additive | Resistance to Settling | Luster | Color Stability [1] |
|---|---|---|---|---|
| Example 8 | Modified montmorillonite | Excellent | Excellent | Excellent. |
| Control 8A | None | Poor | Fair | Do. |
| Control 8B | Lecithin | Poor—Flocculates | Good | Fair. |
| Control 8C | Magnesium stearate | do | Poor | Excellent. |
| Control 8D | Benzyl trimethylammonium hydroxide | Very poor | Very poor | Very poor. |
| Control 8E | Dibutylamine pyrophosphate | Poor | Fair | Good. |

[1] To Rhodamine B (D and C Red No. 19).

The nail enamel films were further compared for luster by brushing on the nail, and, also, by making drawdowns on a hiding power chart by means of a Boston-Bradley blade (6 in x 3 mil.) and a Bird vacuum plate.

Inspection of the nail enamels and the drawdowns indicated that the nail enamel prepared in accordance with Example 8 had a luster superior to that exhibited by any of the films produced employing the several control formulations (8A–8E).

Examples 9–20.—Nail enamels containing varying lacquer components

These examples illustrate some of the many variations which may be made in the basic ingredients of the modified clay-containing nail lacquer formulations of the present invention, without departing from the scope of the invention. Thus, nail lacquers were prepared incorporating varying film formers (nitrocellulose—Examples 9–15 and 20; cellulose acetate-butyrate—Examples 16 and 17; polystyrene—Example 18; and ethyl cellulose—Example 19), modifying resins (dammar—Example 9; polyester—

Examples 10, 12 and 15; aryl-sulfonamide-formaldehyde—Examples 11, 14 and 16–19; and alkyd—Examples 13 and 20), plasticizers (tricresyl phosphate—Examples 9, 10 and 15; triethyl citrate—Examples 11, 13 and 14; dibutyl phthalate—Examples 16–20, and tricresyl phosphate-dibutyl phthalate mixtures—Example 12), solvents (butyl acetate—Examples 9–11 and 14–20; butyl acetate-ethyl acetate mixtures—Example 13; and amyl acetate-ethyl acetate mixtures—Example 12); alcoholic couplers or cosolvents (isopropanol—Example 9, 13, 20; isopropanol-ethanol mixtures—Examples 10–12, 14, 15, and 17–19; ethanol—Example 12; and no coupler—Example 16), diluents (toluene—Examples 9–12, 14–18 and 20; n-hexane—Example 19, and no diluent—Example 13), colorants (Rhodamine B—Examples 10, 11 and 13–19; Lithol B—Example 12, Example 20; and no colorant—Example 9), nacreous pigments (natural pearl essence—Examples 9–13 and 16–20; TiO$_2$-coated mica—Example 14; and BiOCl—Example 15) and, lastly, ammonium cation—modified montmorillonite clay suspending agents ("Bentone–38"—Examples 9, 13 and 19; "Bentone–27"—Examples 10, 12, 15–18 and 20; and "Bentone–34"—Examples 11 and 14).

The ingredients of the several nail lacquers of Examples 9–20 are identified in Table IV below, and the proportions of the individual components of such lacquers are listed in Tables V–XVI, respectively. Control formulations, whose compositions are also given in Tables V–XVI, were also prepared in connection with the lacquers of each of Examples 9–20. The control lacquers were similar to those described above in connection with Example 8 incorporating, respectively, no anti-settling additive (the "A" Controls), lecithin as such an additive (the "B" Controls), magnesium stearate as such an additive (the "C" Controls), benzyl trimethylammonium hydroxide in methanol as such an additive (the "D" Controls), and dibutylamine pyrophosphate as such an additive (the "E" Controls). The compositions of the several nail lacquer examples and controls are fully identified in the following tables.

In the several tables the proportions of the various lacquer ingredients, e.g., the amounts of the solvents utilized for the nitrocellulose and pearl essence solutions employed for formulation purposes, have been separately indicated. The compositions of the make-up solutions for the various lacquer ingredients are, however, set forth by footnotes to the respective tables. In Table IV the compositions of the several lacquer ingredients have, as a matter of convenience, not been identified at each occurrence in the table; thus, while Monsanto's "Santolite MHP" was the arylsulfonamide-formaldehyde resin employed in each instance, it has been so identified where only first referred to in the table.

TABLE IV.—INGREDIENTS OF NAIL ENAMELS OF EXAMPLES 9–20

| Ex. No. | Film-Former | Resin | Plasticizer | Solvent | Co-solvent | Diluent | Colorant | Nacreous Pigment [20] | Anti-Settling Additive |
|---|---|---|---|---|---|---|---|---|---|
| 9 | NC [1] | Dammar [5] | TCP [9] | BuAc [13] | iPOH [16] | Toluene | | Pearl Essence [21] | B-38 [27] |
| 10 | NC [1] | Polyester [6] | TCP [9] | BuAc [13] | iPOH+EtOH [17] | do | Rhodamine B [18] | do | B-27 [28] |
| 11 | NC [1] | Aryl Sulfonamide [7] | TEC [10] | BuAc [13] | iPOH+EtOH [17] | do | do | do | B-34 [29] |
| 12 | NC [1] | Polyester | TCP-DBP [11] | BuAc [13] | EtOH | do | D and C Red No. 7 [19] | do | B-38 |
| 13 | NC [1] | Alkyd [8] | TEC | BuAc-EtAc [14] | iPOH | | Rhodamine B | do | B-38 |
| 14 | NC [1] | Aryl Sulfonamide | TEC | BuAc | iPOH+EtOH | Toluene | do | Coated Mica [22] | B-34 |
| 15 | NC [1] | Polyester | TCP | BuAc | iPOH+EtOH | do | do | BiOCl [23] | B-27 |
| 16 | CAB [2] | Aryl Sulfonamide | DBP [12] | BuAc | | do | do | Pearl Essence [24] | B-27 |
| 17 | CAB [2] | do | DBP [12] | BuAc | iPOH+EtOH | do | do | do | B-27 |
| 18 | PS [3] | do | DBP [12] | BuAc | iPOH+EtOH | do | do | do [25] | B-27 |
| 19 | EC [4] | do | DBP [12] | BuAc | iPOH+EtOH | Hexane | do | Pearl Essence | B-38 |
| 20 | NC | Alkyd | DBP [12] | AmAc-EtAc [15] | iPOH | Toluene | D and C Red No. 7 | do [26] | B-34 |

[1] Nitrocellulose ½ Second, "RS Type" (Hercules).
[2] Cellulose Acetate-Butyrate, ½ Second (Eastman Chem. Prod. Inc.).
[3] Polystyrene, "Styron 666–K 27–22" (Dow).
[4] Ethyl Cellulose, N–10 (Hercules).
[5] (Dammar)—Natural Resin (O.G. Innes Corp.); this resin has a softening point of 77–81° C., a melting point of 79–85° C., and an Acid No. of 25–31.
[6] "Hercoflex 900" (Hercules); this liquid polyester has a flash point (Cleveland open cup) of 238° C., a boiling point (at 1 mm. Hg) of 180° C., and an Acid No. of 20–30.
[7] "Santolite MHP" (Monsanto); this resin has a Specific Gravity of 1.35, a softening point of 62, and an acidity (mg. KOH/g.) of 1.
[8] "Rezyl 14–7C–55", 55% solids in Ethyl Acetate plus Ethyl Cellosolve Acetate (Koppers); the "Rezyl" resin is an oil-free, nonoxidizing alykd having an Acid Number of 30–40 and a minimum 42% phthalic anhydride equivalent.
[9] Tricresyl Phosphate.
[10] Triethyl Citrate.
[11] Tricresyl Phosphate-Dibutyl Phthalate Mixture.
[12] Dibutyl Phthalate.
[13] Butyl Acetate.
[14] Butyl Acetate-Ethyl Acetate Mixture.
[15] Amyl Acetate-Ethyl Acetate Mixture.
[16] Isopropanol.
[17] Isopropanol-Ethanol Mixture.
[18] D and C Red No. 19, viz, 3-ethochloride of 9-o-carboxyphenol-6-diethylamino-3-ethylimino-3-isoxanthene.
[19] D and C Red No. 7 [Ca salt of Lithol Rubin B, viz, Ca salt of 4-(o-sulfo-p-tolylazo)-3-hydroxy-2-naphthanoic acid].
[20] In each of the pearl essence formulations listed, a small amount of a stabilizing polymer, e.g., a trace of nitrocellulose or cellulose acetate butyrate, was incorporated.
[21] Pearl Essence, 22% fish scale platelets in butyl acetate.
[22] Gold-reflecting TiO$^2$-coated mica flakes.
[23] Bismuth Oxychloride (77% in Cellosolve).
[24] Pearl Essence, 22% fish scale platelets in methyl isobutyl ketone (54%) and butyl acetate (24%).
[25] Pearl Essence, 22% fish scale platelets in isopropanol (63%) and toluene (15%).
[26] Pearl Essence, 22% fish scale platelets in isopropanol (54%) and ethyl acetate (24%).
[27] "Bentone 38", National Lead Co. See Table II.
[28] "Bentone 27", National Lead Co. See Table II.
[29] "Bentone 34", National Lead Co. See Table II.

TABLE V.—COMPOSITIONS OF EXAMPLE 9 AND CONTROLS 9A–9E

| Lacquer | NC[1] | Dammar | TCP | n-BuAc | iPOH | Toluene | Pearl Essence 22% | Anti-Settling Additive Type | Concn., Percent |
|---|---|---|---|---|---|---|---|---|---|
| Ex. 9 | 11.0 | 7.0 | 5.0 | 31.0 | 7.0 | 34.0 | 4.0 | B-38 | 1.0 |
| Control: | | | | | | | | | |
| 9A | 11.0 | 7.0 | 5.0 | 32.0 | 7.0 | 34.0 | 4.0 | None | |
| 9B | 11.0 | 7.0 | 5.0 | 31.0 | 7.0 | 34.0 | 4.0 | Lecithin | 1.0 |
| 9C | 11.0 | 7.0 | 5.0 | 31.0 | 7.0 | 34.0 | 4.0 | Mg. St.[2] | 1.0 |
| 9D | 11.0 | 7.0 | 5.0 | 30.8 | 7.0 | 34.0 | 4.0 | BTMA [3] | 1.2 |
| 9E | 11.0 | 7.0 | 5.0 | 31.5 | 7.0 | 34.0 | 4.0 | DBAP [4] | 0.5 |

[1] The Nitrocellulose was employed in the form of a solution in Isopropanol and n-Butyl acetate.—Nitrocellulose, ½ Second, RS type=36.0%; Isopropanol=15.3%; n-Butyl acetate=48.7%.
[2] Magnesium Stearate.
[3] 40% Benzyl Trimethyl Ammonium Hydroxide in Methanol.
[4] Dibutylamine Pyrophosphate.

NOTE.—Abbreviations in column headings are as defined in Table IV.

TABLE VI.—COMPOSITIONS OF EXAMPLE 10 AND CONTROLS 10A–10E

| Lacquer | NC[1] | Polyester | TCP | n-BuAc | Toluene | iPOH | EtOH | Pearl Essence 22% | Anti-Settling Additive | |
|---|---|---|---|---|---|---|---|---|---|---|
| | | | | | | | | | Type | Concn. |
| Ex. 10 | 11.0 | 7.0 | 5.0 | 31.0 | 34.0 | 4.7 | 2.3 | 4.0 | B-27 | 1.0 |
| Control: | | | | | | | | | | |
| 10A | 11.0 | 7.0 | 5.0 | 32.0 | 34.0 | 4.7 | 2.3 | 4.0 | None | |
| 10B | 11.0 | 7.0 | 5.0 | 31.0 | 34.0 | 4.7 | 2.3 | 4.0 | Lecithin | 1.0 |
| 10C | 11.0 | 7.0 | 5.0 | 31.0 | 34.0 | 4.7 | 2.3 | 4.0 | Mg. St.[2] | 1.0 |
| 10D | 11.0 | 7.0 | 5.0 | 30.8 | 34.0 | 4.7 | 2.3 | 4.0 | BTMA[3] | 1.2 |
| 10E | 11.0 | 7.0 | 5.0 | 31.4 | 34.0 | 4.7 | 2.3 | 4.0 | DBAP[4] | 0.5 |

[1] The Nitrocellulose was employed in the form of a solution in Isopropanol and n-Butyl acetate.—Nitrocellulose, ½ Second, RS type=36.0%; Isopropanol=15.3%; n-Butyl acetate=48.7%.
[2] Magnesium Stearate.
[3] 40% Benzyl Trimethyl Ammonium Hydroxide in Methanol.
[4] Dibutylamine Pyrophosphate.
NOTE.—Abbreviations in column headings are as defined in Table IV.

TABLE VII.—COMPOSITIONS OF EXAMPLE 11 AND CONTROLS 11A–11E

| Lacquer | NC[1] | Aryl Sulfonamide | TEC | n-BuAc | Toluene | iPOH | EtOH | Pearl Essence 22% | Anti-Settling Additive | |
|---|---|---|---|---|---|---|---|---|---|---|
| | | | | | | | | | Type | Concn. |
| Ex. 11 | 11.0 | 7.0 | 5.0 | 31.1 | 32.0 | 4.7 | 2.3 | 4.0 | B-34 | 2.9 |
| Control: | | | | | | | | | | |
| 11A | 11.0 | 7.0 | 5.0 | 34.0 | 32.0 | 4.7 | 2.3 | 4.0 | None | |
| 11B | 11.0 | 7.0 | 5.0 | 31.1 | 32.0 | 4.7 | 2.3 | 4.0 | Lecithin | 2.9 |
| 11C | 11.0 | 7.0 | 5.0 | 31.1 | 32.0 | 4.7 | 2.3 | 4.0 | Mg. St.[2] | 2.9 |
| 11D | 11.0 | 7.0 | 5.0 | 32.8 | 32.0 | 4.7 | 2.3 | 4.0 | BTMA[3] | 1.2 |
| 11E | 11.0 | 7.0 | 5.0 | 33.5 | 32.0 | 4.7 | 2.3 | 4.0 | DBAP[4] | 0.5 |

[1] The Nitrocellulose was employed in the form of a solution in Isopropanol and n-Butyl acetate.—Nitrocellulose, ½ Second, RS type=36.0%; Isopropanol=15.3%; n-Butyl acetate=48.7%.
[2] Magnesium Stearate.
[3] 40% Benzyl Trimethyl Ammonium Hydroxide in Methanol.
[4] Dibutylamine Pyrophosphate.
NOTE.—Abbreviations in column headings are as defined in Table IV.

TABLE VIII.—COMPOSITIONS OF EXAMPLE 12 AND CONTROLS 12A–12E

| Lacquer | NC[1] | Polyester | DBP-TCP | n-BuAc | Toluene | EtOH | Pearl Essence 22% | Anti-Settling Additive | |
|---|---|---|---|---|---|---|---|---|---|
| | | | | | | | | Type | Concn. |
| Ex. 12 | 11.0 | 7.0 | 2.5+2.5 | 31.7 | 33.0 | 8.3 | 4.0 | B-38 | 1.0 |
| Control: | | | | | | | | | |
| 12A | 11.0 | 7.0 | 2.5+2.5 | 32.7 | 33.0 | 8.3 | 4.0 | None | |
| 12B | 11.0 | 7.0 | 2.5+2.5 | 31.7 | 33.0 | 8.3 | 4.0 | Lecithin | 1.0 |
| 12C | 11.0 | 7.0 | 2.5+2.5 | 31.7 | 33.0 | 8.3 | 4.0 | Mg. St.[2] | 1.0 |
| 12D | 11.0 | 7.0 | 2.5+2.5 | 31.5 | 33.0 | 8.3 | 4.0 | BTMA[3] | 1.2 |
| 12E | 11.0 | 7.0 | 2.5+2.5 | 32.2 | 33.0 | 8.3 | 4.0 | DBAP[4] | 0.5 |

[1] The Nitrocellulose was employed in the form of a solution in Ethanol and n-Butyl acetate.—Nitrocellulose, ½ Second, RS type=30.0%; Ethanol=16.2%; n-Butyl acetate=48.7%.
[2] Magnesium Stearate.
[3] 40% Benzyl Trimethyl Ammonium Hydroxide in Methanol.
[4] Dibutylamine Pyrophosphate.
NOTE.—Abbreviations in column headings are as defined in Table IV.

TABLE IX.—COMPOSITIONS OF EXAMPLE 13 AND CONTROLS 13A–13E

| Laquer | NC[1] | 55% Alkyd | TEC | n-BuAc | EtAc | iPOH | Pearl Essence 22% | Anti-Settling Additive | |
|---|---|---|---|---|---|---|---|---|---|
| | | | | | | | | Type | Concn. |
| Ex. 13 | 11.0 | 12.7 | 5.0 | 37.3 | 22.0 | 7.0 | 4.0 | B-38 | 1.0 |
| Control: | | | | | | | | | |
| 13A | 11.0 | 12.7 | 5.0 | 38.3 | 22.0 | 7.0 | 4.0 | None | |
| 13B | 11.0 | 12.7 | 5.0 | 37.3 | 22.0 | 7.0 | 4.0 | Lecithin | 1.0 |
| 13C | 11.0 | 12.7 | 5.0 | 37.3 | 22.0 | 7.0 | 4.0 | Mg. St.[2] | 1.0 |
| 13D | 11.0 | 12.7 | 5.0 | 37.1 | 22.0 | 7.0 | 4.0 | BTMA[3] | 1.2 |
| 13E | 11.0 | 12.7 | 5.0 | 37.8 | 22.0 | 7.0 | 4.0 | DBAP[4] | 0.5 |

[1] The Nitrocellulose was employed in the form of a solution in Isopropanol and n-Butyl acetate. – Nitrocellulose, ½ Second, RS type=36.0%; Isopropanol=15.3%; n-Butyl acetate=48.7%.
[2] Magnesium Stearate.
[3] 40% Benzyl Trimethylammonium Hydroxide in Methanol.
[4] Dibutylamine Pyrophosphate.
NOTE. –Abbreviations in column headings are as defined in Table IV.

TABLE X.—COMPOSITIONS OF EXAMPLE 14 AND CONTROLS 14A–14E

| Lacquer | NC[1] | Aryl Sulfonamide | TEC | n-BuAc | Toluene | iPOH | EtOH | Coated Mica (dry) | Anti-Settling Additive | |
|---|---|---|---|---|---|---|---|---|---|---|
| | | | | | | | | | Type | Concn. |
| Ex. 14 | 11.0 | 7.0 | 5.0 | 33.1 | 32.0 | 4.7 | 2.3 | 2.0 | B-34 | 2.9 |
| Control: | | | | | | | | | | |
| 14A | 11.0 | 7.0 | 5.0 | 36.0 | 32.0 | 4.7 | 2.3 | 2.0 | None | |
| 14B | 11.0 | 7.0 | 5.0 | 33.1 | 32.0 | 4.7 | 2.3 | 2.0 | Lecithin | 2.9 |
| 14C | 11.0 | 7.0 | 5.0 | 33.1 | 32.0 | 4.7 | 2.3 | 2.0 | Mg. St.[2] | 2.9 |
| 14D | 11.0 | 7.0 | 5.0 | 34.8 | 32.0 | 4.7 | 2.3 | 2.0 | BTMA[3] | 1.2 |
| 14E | 11.0 | 7.0 | 5.0 | 35.5 | 32.0 | 4.7 | 2.3 | 2.0 | DBAP[4] | 0.5 |

[1] The Nitrocellulose was employed in the form of a solution in Isopropanol and n-butyl acetate.—Nitrocellulose, ½ Second, RS type=36.0%; Isopropanol=15.3%; n-Butyl acetate=48.7%.
[2] Magnesium Stearate.
[3] 40% Benzyl Trimethyl Ammonium Hydroxide in Methanol.
[4] Dibutylamine Pyrophosphate.
NOTE.—Abbreviations in column headings are as defined in Table IV.

TABLE XI.—COMPOSITIONS OF EXAMPLE 15 AND CONTROLS 15A–15E

| Lacquer | NC [1] | Polyester | TCP | n-BuAc | Toluene | iPOH | EtOH | BiOCl 77% | Anti-Settling Additive Type | Anti-Settling Additive Concn. |
|---|---|---|---|---|---|---|---|---|---|---|
| Ex. 15 | 11.0 | 7.0 | 5.0 | 33.7 | 34.0 | 4.7 | 2.3 | 1.3 | B-27 | 1.0 |
| Control: | | | | | | | | | | |
| 15A | 11.0 | 7.0 | 5.0 | 34.7 | 34.0 | 4.7 | 2.3 | 1.3 | None | |
| 15B | 11.0 | 7.0 | 5.0 | 33.7 | 34.0 | 4.7 | 2.3 | 1.3 | Lecithin | 1.0 |
| 15C | 11.0 | 7.0 | 5.0 | 33.7 | 34.0 | 4.7 | 2.3 | 1.3 | Mg. St.[2] | 1.0 |
| 15D | 11.0 | 7.0 | 5.0 | 33.5 | 34.0 | 4.7 | 2.3 | 1.3 | BTMA [3] | 1.2 |
| 15E | 11.0 | 7.0 | 5.0 | 34.2 | 34.0 | 4.7 | 2.3 | 1.3 | DBAP [4] | 0.5 |

[1] The Nitrocellulose was employed in the form of a solution in Isopropanol and n-butyl acetate.—Nitrocellulose, ½ Second, RS type=36.0%; Isopropanol=15.3%; n-Butyl acetate=48.7%.
[2] Magnesium Stearate.
[3] 40% Benzyl Trimethyl Ammonium Hydroxide in Methanol.
[4] Dibutylamine Pyrophosphate.

Note.—Abbreviations in column headings are as defined in Table IV.

TABLE XII.—COMPOSITIONS OF EXAMPLE 16 AND CONTROLS 16A–16E

| Lacquer | CAB | Aryl Sulfonamide | DBP | n-BuAc | Toluene | Pearl Essence 22% | Anti-Settling Additive Type | Anti-Settling Additive Concn. |
|---|---|---|---|---|---|---|---|---|
| Ex. 16 | 11.0 | 10.0 | 6.0 | 25.7 | 42.3 | 4.0 | B-27 | 1.0 |
| Control: | | | | | | | | |
| 16A | 11.0 | 10.0 | 6.0 | 26.7 | 42.3 | 4.0 | None | |
| 16B | 11.0 | 10.0 | 6.0 | 25.7 | 42.3 | 4.0 | Lecithin | 1.0 |
| 16C | 11.0 | 10.0 | 6.0 | 25.7 | 42.3 | 4.0 | Mg. St.[1] | 1.0 |
| 16D | 11.0 | 10.0 | 6.0 | 25.5 | 42.3 | 4.0 | BTMA [2] | 1.2 |
| 16E | 11.0 | 10.0 | 6.0 | 26.2 | 42.3 | 4.0 | DBAP [3] | 0.5 |

[1] Magnesium Stearate.
[2] 40% Benzyl Trimethyl Ammonium Hydroxide in Methanol.
[3] Dibutylamine Pyrophosphate.

Note.—Abbreviations in column headings are as defined in Table IV.

TABLE XIII.—COMPOSITIONS OF EXAMPLE 17 AND CONTROLS 17A–17E

| Lacquer | CAB | Aryl Sulfonamide | DBP | n-BuAc | Toluene | EtOH | Pearl Essence 22% | Non-Settling Additive Type | Non-Settling Additive Concn. |
|---|---|---|---|---|---|---|---|---|---|
| Ex. 17 | 11.0 | 10.0 | 6.0 | 24.5 | 41.2 | 2.3 | 4.0 | B-27 | 1.0 |
| Control: | | | | | | | | | |
| 17A | 11.0 | 10.0 | 6.0 | 25.5 | 41.2 | 2.3 | 4.0 | None | |
| 17B | 11.0 | 10.0 | 6.0 | 24.5 | 41.2 | 2.3 | 4.0 | Lecithin | 1.0 |
| 17C | 11.0 | 10.0 | 6.0 | 24.5 | 41.2 | 2.3 | 4.0 | Mg. St.[1] | 1.0 |
| 17D | 11.0 | 10.0 | 6.0 | 24.3 | 41.2 | 2.3 | 4.0 | BTMA [2] | 1.2 |
| 17E | 11.0 | 10.0 | 6.0 | 25.0 | 41.2 | 2.3 | 4.0 | DBAP [3] | 0.5 |

[1] Magnesium Stearate.
[2] 40% Benzyl Trimethyl Ammonium Hydroxide in Methanol.
[3] Dibutylamine Pyrophosphate.

Note.—Abbreviations in column headings are as defined in Table IV.

TABLE XIV.—COMPOSITIONS OF EXAMPLE 18 AND CONTROLS 18A–18E

| Lacquer | PS | Aryl Sulfonamide | DBP | n-BuAc | Toluene | EtOH | Pearl Essence 22% | Non-Settling Additive Type | Non-Settling Additive Concn. |
|---|---|---|---|---|---|---|---|---|---|
| Ex. 18 | 11.0 | 10.0 | 6.0 | 22.6 | 41.2 | 2.3 | 4.0 | B-27 | 2.9 |
| Control: | | | | | | | | | |
| 18A | 11.0 | 10.0 | 6.0 | 25.5 | 41.2 | 2.3 | 4.0 | None | |
| 18B | 11.0 | 10.0 | 6.0 | 22.6 | 41.2 | 2.3 | 4.0 | Lecithin | 2.9 |
| 18C | 11.0 | 10.0 | 6.0 | 22.6 | 41.2 | 2.3 | 4.0 | Mg. St.[1] | 2.9 |
| 18D | 11.0 | 10.0 | 6.0 | 24.3 | 41.2 | 2.3 | 4.0 | BTMA [2] | 1.2 |
| 18E | 11.0 | 10.0 | 6.0 | 25.5 | 41.2 | 2.3 | 4.0 | DBAP [3] | 0.5 |

[1] Magnesium Stearate.
[2] 40% Benzyl Trimethyl Ammonium Hydroxide in Methanol.
[3] Dibutylamine Pyrophosphate.

Note.—Abbreviations in column headings are as defined in Table IV.

TABLE XV.—COMPOSITIONS OF EXAMPLE 19 AND CONTROLS 19A–19E

| Lacquer | EC | Aryl Sulfonamide | DBP | n-BuAc | Hexane | EtOH | Pearl Essence 22% | Non-Settling Additive Type | Non-Settling Additive Concn. |
|---|---|---|---|---|---|---|---|---|---|
| Ex. 19 | 11.0 | 7.0 | 6.0 | 16.0 | 35.0 | 20.0 | 4.0 | B-38 | 1.0 |
| Control: | | | | | | | | | |
| 19A | 11.0 | 7.0 | 6.0 | 17.0 | 35.0 | 20.0 | 4.0 | None | |
| 19B | 11.0 | 7.0 | 6.0 | 16.0 | 35.0 | 20.0 | 4.0 | Lecithin | 1.0 |
| 19C | 11.0 | 7.0 | 6.0 | 16.0 | 35.0 | 20.0 | 4.0 | Mg. St.[1] | 1.0 |
| 19D | 11.0 | 7.0 | 6.0 | 15.8 | 35.0 | 20.0 | 4.0 | BTMA [2] | 1.2 |
| 19E | 11.0 | 7.0 | 6.0 | 16.5 | 35.0 | 20.0 | 4.0 | DBAP [3] | 0.5 |

[1] Magnesium Stearate.
[2] 40% Benzyl Trimethyl Ammonium Hydroxide in Methanol.
[3] Dibutylamine Pyrophosphate.

Note.—Abbreviations in column headings are as defined in Table IV.

TABLE XVI.—COMPOSITIONS OF EXAMPLE 20 AND CONTROLS 20A-20E

| Lacquer | NC[1] | 55% Alkyd | DBP | AmAc-EtAc | Toluene | iPOH | Pearl Essence 22% | Non-Settling Additive | |
|---|---|---|---|---|---|---|---|---|---|
| | | | | | | | | Type | Concn. |
| Ex. 20 | 11.0 | 12.7 | 5.0 | 12.5+14.8 | 33.0 | 7.0 | 4.0 | B-34 | 1.9 |
| Control: | | | | | | | | | |
| 20A | 11.0 | 12.7 | 5.0 | 12.5+16.7 | 33.0 | 7.0 | 4.0 | None | |
| 20B | 11.0 | 12.7 | 5.0 | 12.5+14.8 | 33.0 | 7.0 | 4.0 | Lecithin | 1.9 |
| 20C | 11.0 | 12.7 | 5.0 | 12.5+14.8 | 33.0 | 7.0 | 4.0 | Mg. St.[2] | 1.9 |
| 20D | 11.0 | 12.7 | 5.0 | 12.5+15.5 | 33.0 | 7.0 | 4.0 | BTMA[3] | 1.2 |
| 20E | 11.0 | 12.7 | 5.0 | 12.5+16.2 | 33.0 | 7.0 | 4.0 | DBAP[4] | 0.5 |

[1] The Nitrocellulose was employed in the form of a solution in Isopropanol and Ethyl acetate.—Nitrocellulose, ½ Second, RS type=40.0%; Isopropanol=17.2%; n-Butyl acetate=42.8%.
[2] Magnesium Stearate.
[3] 40% Benzyl Trimethyl Ammonium Hydroxide in Methanol.
[4] Dibutylamine Pyrophosphate.

NOTE.—Abbreviations in column headings are as defined in Table IV.

As indicated hereinabove, Rhodamine B was added (at .003%) to the test and control lacquers, of each of Examples 9-11 and 13-19, D&C Red No. 7 being added (at .007%) to the formulations of Examples 12 and 20.

The several test and control samples were placed in clear glass jars and permitted to stand for several days. The samples were then qualitatively compared, as in connection with Example 8 and Controls 8A-8E above. After 10 days (compositions 12 and 20) or 19 days (compositions 9-11 and 13-19), the following differences were observed between the respective lacquers:

TABLE XVII.—COMPARISON OF CHARACTERISTICS OF NAIL ENAMELS OF EXAMPLES 9-20 AND CORRESPONDING CONTROLS 9A-20E

| Test Sample | Anti-Settling Additive | Resistance to Settling | Luster |
|---|---|---|---|
| Example 9 | Modified Montmorillonite | Excellent | Excellent. |
| Control: | | | |
| 9A | | Poor | Fair. |
| 9B | Lecithin | do.[1] | Poor. |
| 9C | Magnesium Stearate | Very Poor | Do. |
| 9D | Benzyl Trimethyl-ammonium Hydroxide | do | None. |
| 9E | Dibutylamine Pyrophosphate | Poor | Fair. |
| Example 10 | Modified Montmorillonite | Excellent | Excellent. |
| Control: | | | |
| 10A | | Poor | Fair. |
| 10B | Lecithin | do.[1] | Poor. |
| 10C | Magnesium Stearate | Very Poor | Do. |
| 10D | Benzyl Trimethyl-ammonium Hydroxide | do | None. |
| 10E | Dibutylamine Pyrophosphate | Poor | Fair. |
| Example 11 | Modified Montmorillonite | Excellent | Excellent. |
| Control: | | | |
| 11A | | Poor | Fair. |
| 11B | Lecithin | do.[1] | Poor. |
| 11C | Magnesium Stearate | do.[1] | Fair. |
| 11D | Benzyl Trimethyl-ammonium Hydroxide | Very Poor | None. |
| 11E | Dibutylamine Pyrophosphate | Poor | Fair. |
| Example 12 | Modified Montmorillonite | Excellent | Very Good. |
| Control: | | | |
| 12A | | Poor | Fair. |
| 12B | Lecithin | do.[1] | Poor. |
| 12C | Magnesium Stearate | Very Poor | Fair. |
| 12D | Benzyl Trimethyl-ammonium Hydroxide | do | Poor. |
| 12E | Dibutylamine Pyrophosphate | Poor | Fair. |
| Example 13 | Modified Montmorillonite | Excellent | Very Good. |
| Control: | | | |
| 13A | | Poor | Fair. |
| 13B | Lecithin | do | Poor. |
| 13C | Magnesium Stearate | Poor | Fair. |
| 13D | Benzyl Trimethyl-ammonium Hydroxide | Very Poor | Very Poor. |
| 13E | Dibutylamine Pyrophosphate | Poor[1] | Fair. |
| Example 14 | Modified Montmorillonite | Excellent | Excellent. |
| Control: | | | |
| 14A | | Very Poor | None. |
| 14B | Lecithin | do | Do. |
| 14C | Magnesium Stearate | Poor | Very Poor. |
| 14D | Benzyl Trimethyl-ammonium Hydroxide | Very Poor | None. |
| 14E | Dibutylamine Pyrophosphate | do | Do. |
| Example 15 | Modified Montmorillonite | Excellent | Very Good. |
| Control: | | | |
| 15A | | Very Poor | None. |
| 15B | Lecithin | do | Do. |
| 15C | Magnesium Stearate | Poor | Very Poor. |
| 15D | Benzyl Trimethyl-ammonium Hydroxide | Very Poor | None. |
| 15E | Dibutylamine Pyrophosphate | do | Do. |
| Example 16 | Modified Montmorillonite | Excellent | Very good. |
| Control: | | | |
| 16A | | Poor[1] | Poor. |
| 16B | Lecithin | Fair[1] | Very Poor. |
| 16C | Magnesium Stearate | Poor[1] | Poor. |
| 16D | Benzyl Trimethyl-ammonium Hydroxide | Good[1] | Do. |
| 16E | Dibutylamine Pyrophosphate | Fair[1] | Do. |
| Example 17 | Modified Montmorillonite | Excellent | Excellent. |
| Control: | | | |
| 17A | | Poor[1] | Poor. |
| 17B | Lecithin | Fair[1] | None. |
| 17C | Magnesium Stearate | Poor[1] | Poor. |
| 17D | Benzyl Trimethyl-ammonium Hydroxide | Good[1] | Do. |
| 17E | Dibutylamine Pyrophosphate | Fair[1] | Do. |
| Example 18 | Modified Montmorillonite | Excellent | Very Good. |
| Control: | | | |
| 18A | | Fair[1] | Poor. |
| 18B | Lecithin | Poor[1] | Good. |
| 18C | Magnesium Stearate | Good[1] | Very Poor. |
| 18D | Benzyl Trimethyl-ammonium Hydroxide | Fair[1] | Poor. |
| 18E | Dibutylamine Pyrophosphate | do[1] | Do. |
| Example 19 | Modified Montmorillonite | Excellent | Very Good. |
| Control: | | | |
| 19A | | Fair | Fair. |
| 19B | Lecithin | do | Do. |
| 19C | Magnesium Stearate | do | Do. |
| 19D | Benzyl Trimethyl-ammonium Hydroxide | Poor | Do. |
| 19E | Dibutylamine Pyrophosphate | Poor[1] | Poor. |
| Example 20 | Modified Montmorillonite | Excellent | Excellent. |
| Control: | | | |
| 20A | | Poor | Fair. |
| 20B | Lecithin | Good[1] | Do. |
| 20C | Magnesium Stearate | do.[1] | Do. |
| 20D | Benzyl Trimethyl-ammonium Hydroxide | Fair[1] | Very Poor. |
| 20E | Dibutylamine Pyrophosphate | Poor[1] | Fair. |

[1] Flocculated.

It is apparent from the preceding examples that markedly improved suspension of nacreous pigments is obtained by the use of the organophilic tetra-substituted ammonium cation-modified clays hereof. The improvement in suspension is obtained without, however, any interference with the nacreous properties or any other properties of the nail enamel.

I claim:

1. A nail enamel composition comprising a film-former, a resin, a plasticizer, a solvent system and a nacreous pigment, said nacreous pigment exhibiting pearly luster upon reflection of light therefrom and, as an anti-settling agent therefor, from about 0.4 to 6.0% by weight of a quaternary ammonium cation-modified montmorillonite clay of the formula:

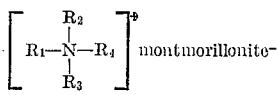

wherein:
  $R_1$ is an alkyl of from 10 to 24 carbon atoms,
  $R_2$ is hydrogen, benzyl, or an alkyl group of from 10 to 24 carbon atoms, and
  $R_3$ and $R_4$ are each hydrogen or lower alkyl.

2. The nail enamel composition of claim 1, in which said nacerous pigment is constituted of discrete pigment particles having lengths of from 2 to 100 microns and ratios of length to thickness of at least 4, the index of refraction of said pigment being at least 0.2 unit from the index of refraction of the film-forming constitutents of said lacquer.

3. The nail enamel composition of claim 1, in which the nacreous pigment is natural pearl essence, and in which said pigment is constituted of discrete pigment particles having lengths of from 10 to 60 microns and thicknesses of from 20 to 80 millimicrons.

4. The nail enamel composition of claim 1, in which the nacreous pigment is bismuth oxychloride.

5. The nail enamel composition of claim 1, in which the nacreous pigment is titanium dioxide-coated mica.

6. The nail enamel composition of claim 1, wherein the substituents on the quaternary ammonium cation-modified montmorillonite clay are as follows:
  $R_1$ is an alkyl group of from 12 to 18 carbon atoms,
  $R_2$ is hydrogen, benzyl, or an alkyl group of from 12 to 18 carbon atoms, and
  $R_3$ and $R_4$ are each hydrogen or methyl.

7. The nail enamel composition of claim 1, in which the quaternary ammonium cation-modified montmorillonite clay is dimethyl dioctadecyl ammonium montmorillonite.

8. The nail enamel composition of claim 1, in which the quaternary ammonium cation-modified montmorillonite clay is benzyl dodecyl dimethyl ammonium montmorillonite.

9. The nail enamel composition of claim 1, in which said film former is nitrocellulose.

10. The nail enamel composition of claim 1, having a solids content of from 20 to 35% by weight and comprising from 8 to 16% film former, 2 to 10% resin, 2 to 10% plasticizer, 0.001 to 5% nacreous pigment, and the balance of the composition constituting the solvent system.

11. The nail enamel composition of claim 10, further incorporating a colorant, the amount of said nacreous pigment and the colorant, in the aggregate, constituting from .001 to 5% by weight of the nail enamel.

References Cited
UNITED STATES PATENTS 2,995,459  8/1961  Soloway _____ 424—61 XR ALBERT T. MEYERS, *Primary Examiner.*

D. R. MAHANAND, *Assistant Examiner.*

U.S. Cl. X.R.

106—316, 288, 300

UNITED STATES PATENT OFFICE
CERTIFICATE OF CORRECTION

Patent No. 3,422,185                                                                   January 14, 1969

Alexander M. Kuritzkes

It is certified that error appears in the above identified patent and that said Letters Patent are hereby corrected as shown below:

In the heading to the printed specification, lines 5 and 6, "Alexander M. Kuritzkes, 35 Observatory Drive, Croton-on-Hudson, N. Y. 10520" should read -- Alexander M. Kuritzkes, Croton-on-Hudson, N. Y., assignor to The Mearl Corporation, Ossining, N. Y., a corporation of New Jersey --. Column 1, line 20, "clap" should read -- clay --; line 72, "useful" should read -- Useful --. Column 2, line 8, "Alchohols" should read -- Alcohols --. Column 5, line 36, "formation" should read -- formulation --. Column 8, line 3, "approvide" should read -- approved --.

Signed and sealed this 17th day of March 1970.

(SEAL)
Attest:

Edward M. Fletcher, Jr.                                   WILLIAM E. SCHUYLER, JR.
Attesting Officer                                                Commissioner of Patents